US008523234B2

(12) United States Patent
Green et al.

(10) Patent No.: US 8,523,234 B2
(45) Date of Patent: Sep. 3, 2013

(54) SHEET DIVIDERS WITH VISIBLE TABS AND CORRESPONDING COVERED TABS

(75) Inventors: Tara M. Green, Placentia, CA (US); Regina A. Reichert, Whittier, CA (US); Monica L. Brox, Corona, CA (US); Ronald Ugolick, San Dimas, CA (US)

(73) Assignee: CCL Label, Inc., Framingham, MA (US)

( * ) Notice: Subject to any disclaimer, the term of this patent is extended or adjusted under 35 U.S.C. 154(b) by 221 days.

(21) Appl. No.: 11/945,249

(22) Filed: Nov. 26, 2007

(65) Prior Publication Data

US 2009/0134617 A1 May 28, 2009

(51) Int. Cl.

| | |
|---|---|
| ***B42D 1/00*** | (2006.01) |
| ***B42D 9/00*** | (2006.01) |
| ***B42D 15/00*** | (2006.01) |
| ***B42F 21/00*** | (2006.01) |
| ***G09C 3/00*** | (2006.01) |

(52) U.S. Cl.

USPC .................. 283/37; 281/3.1; 281/38; 283/36; 283/39; 283/40; 283/41; 283/67; 283/70; 283/72; 283/74; 283/79

(58) Field of Classification Search

USPC ..................... 40/641; 283/36, 37, 38, 39, 40, 283/41, 42, 67, 70, 72, 74, 117; 402/79; 281/3.1, 38

IPC ............... B42D 12/00, 5/00, 5/04; B42F 21/00, B42F 21/02, 21/12

See application file for complete search history.

(56) References Cited

U.S. PATENT DOCUMENTS

| | | | | | |
|---|---|---|---|---|---|
| 176,005 | A * | 4/1876 | Jones | ............................. | 283/36 |
| 186,633 | A * | 1/1877 | Snider | ............................. | 283/37 |
| 675,909 | A * | 6/1901 | Shepherd | ........................ | 283/37 |
| 955,038 | A * | 4/1910 | Bsgby | ............................. | 283/39 |
| 3,748,768 | A | 7/1973 | Strowger | | |
| 4,669,754 | A * | 6/1987 | Lalonde | .......................... | 283/67 |
| 4,696,491 | A | 9/1987 | Stenger | | |
| 4,973,086 | A | 11/1990 | Donnelly et al. | | |

(Continued)

FOREIGN PATENT DOCUMENTS

GB 184306 8/1922

OTHER PUBLICATIONS

Office Action dated Aug. 29, 2008 in related U.S. Appl. No. 11/945,237.

(Continued)

*Primary Examiner* — Dana Ross
*Assistant Examiner* — Justin V Lewis
(74) *Attorney, Agent, or Firm* — Christie, Parker & Hale, LLP

(57) ABSTRACT

A set of sheet dividers comprises a first plurality of sheet dividers, each divider comprising a sheet with a tab extending therefrom at a different location and for a first length along the same side as all other dividers in the first plurality; and a second plurality of sheet dividers, each divider comprising a sheet with a tab extending therefrom at a different location and for a second length along the same side as all other dividers in the second plurality, the second length being shorter than the first length, the second plurality being divided into subsets of dividers having their tabs adjacent one another and overlaid by the tab of a corresponding one of the first plurality of sheet dividers when the subset and corresponding one of the first plurality of sheet dividers are stacked together.

25 Claims, 14 Drawing Sheets

(56) References Cited

U.S. PATENT DOCUMENTS

| | | | | |
|---|---|---|---|---|
| 5,123,676 | A | 6/1992 | Donnelly et al. | |
| 5,468,085 | A | 11/1995 | Kline | |
| 5,503,487 | A | 4/1996 | Ong | |
| 5,921,582 | A * | 7/1999 | Gusack | 283/67 |
| 6,502,742 | B1 | 1/2003 | Su | |
| 6,880,747 | B1 | 4/2005 | Pelleg | |
| 7,125,050 | B2 | 10/2006 | Yamamoto et al. | |
| 2003/0122366 | A1 | 7/2003 | Sapienza et al. | |
| 2006/0082132 | A1 | 4/2006 | Hanes | |

OTHER PUBLICATIONS

International Serach Report and Written Opinion dated Feb. 18, 2009 from Corresponding International Application No. PCT/US2008/84088.

International Preliminary Report on Patentability dated Jan. 26, 2010 from corresponding International Application No. PCT/US2008/84088.

Office action dated Jun. 16, 2010 from related U.S. Appl. No. 11/945,202.

Office action dated Jun. 30, 2010 from related U.S. Appl. No. 11/945,224.

Amendment under Article 34 dated Sep. 24, 2009 from corresponding International Application No. PCT/US2008/084088.

Amendment dated Jun. 25, 2010 from corresponding European Application No. 08855650.1.

Amendment dated Oct. 11, 2010 from related U.S. Appl. No. 11/945,202.

Final rejection dated Nov. 8, 2010 from related U.S. Appl. No. 11/945,202.

Amendment dated Jan. 10, 2011 from related U.S. Appl. No. 11/945,202.

Advisory action dated Jan. 28, 2011 from related U.S. Appl. No. 11/945,202.

Amendment dated Feb. 8, 2011 Amendment from related U.S. Appl. No. 11/945,202.

Article 34 amendment dated Sep. 24, 2009 from related International Application No. PCT/US08/84088.

Amendment dated Jun. 25, 2010 Amendment from related European Application No. 08855650.1.

Office action dated Jan. 31, 2011 from related Chilean Application No. 3502-2008.

Response dated May 9, 2011 from related Chilean Application No. 3502-2008.

Office action dated Sep. 1, 2011 from related Chilean Application No. 3502-2008.

Amendment dated Dec. 6, 2011 from related Chilean Application No. 3502-2008.

Response dated Aug. 30, 2010 from related European Application No. 08855650.1.

Office action dated Jul. 27, 2011 from related New Zealand Application No. 585013.

Office action dated Apr. 13, 2011 from related U.S. Appl. No. 11/045,202.

Amendment dated Jul. 13, 2011 from related U.S. Appl. No. 11/945,202.

Office action dated Sep. 15, 2011 from related U.S. Appl. No. 11/945,202.

Office action dated Sep. 22, 2011 from related European Application No. 08855650.1.

Notice of Loss of Rights in European Application No. 08855650.1 dated May 9, 2012, 1 pg.

Response in European Application No. 08855650.1 dated Jul. 19, 2012, 23 pgs.

Office Action in European Application No. 08855650.1 dated Sep. 6, 2012, 5 pgs.

Amendment in European Application No. 08855650.1 dated Mar. 14, 2013, 17 pgs.

Extended Search Report in European Application No. 12173041.0 dated Oct. 10, 2012, 7 pgs.

Extended Search Report in European Application No. 12171810.0 dated Sep. 27, 2012, 6 pgs.

Office Action in New Zealand Application No. 585013 dated Jul. 27, 2011, 2 pgs.

Response in New Zealand Application No. 585013 dated Oct. 8, 2012, 22 pgs.

Office Action in New Zealand Application No. 585013 dated Oct. 26, 2012, 4 pgs.

Response in New Zealand Application No. 585013 dated Jan. 8, 2013, 12 pgs.

Notice of Acceptance in New Zealand Application No. 585013 dated Feb. 4, 2013, 1 pg.

Office Action in New Zealand Application No. 602792 dated Oct. 10, 2012, 2 pgs.

Office Action in New Zealand Application No. 602793 dated Oct. 10, 2012, 2 pgs.

Response in U.S. Appl. No. 11/945,202 dated Mar. 14, 2012, 21 pgs.

Office Action in U.S. Appl. No. 11/945,202 dated Nov. 14, 2012, 13 pgs.

Amendment in U.S. Appl. No. 11/945,202 dated Mar. 5, 2013, 16 pgs.

http://looseleaf.com/index_tab.htm, dated Feb. 20, 2006.

* cited by examiner

PRIOR ART

SHEET DIVIDERS WITH VISIBLE TABS AND CORRESPONDING COVERED TABS

RELATED APPLICATIONS

This disclosure is related to the subject matter disclosed in co-filed U.S. non-provisional patent applications titled "SHEET DIVIDERS WITH MULTIPLE ROWS OF OFF-SET TABS", U.S. Ser. No. 11/945,202; co-filed U.S. non-provisional patent applications titled "SHEET DIVIDERS WITH MULTIPLE ROWS OF PARTIALLY OFFSET TABS", U.S. Ser. No. 11/945,224; and co-filed U.S. non-provisional patent applications titled "SHEET DIVIDERS WITH MULTIPLE ROWS HAVING EXTENDED PARTIALLY OFFSET TABS", U.S. Ser. No. 11/945,237; the entire contents of which are incorporated in their entirety herein by reference thereto.

TECHNICAL FIELD

This disclosure relates to sheet dividers with tabs.

BACKGROUND

Sheet dividers are widely used office products, typically inserted in a binder to separate sheets of paper into desired categories or sections and as such typically preformed with three holes along one side to receive the binder rings therein. One category of dividers are formed with tabs projecting from the side opposite from the binder rings (i.e. the side opposite from the side with pre-punched holes). As is well known, the holes and, optionally, the tabs are formed along the longer sides of the divider.

FIG. 1 illustrates such a typical sheet divider 100, formed from a sheet 110 with a tab 120 and three pre-punched holes 130. Tabs are typically labeled with some sort of indicia to identify particular sections in the binder, either by being marked with the indicia or being formed to receive a label bearing the indicia therein. The tabs project beyond the sheets of paper so that a user can easily access a desired section in the binder. As also illustrated in FIG. 1, such dividers are typically sold in sets of dividers that have tabs 120, 122, 124, etc. formed along the same side but at different positions arranged in a staggered pattern that allows all tabs to be visible when the set of dividers is arranged in a stack, regardless of the order of the dividers in the stack.

As is apparent from FIG. 1, a limitation of such typical dividers is that for a given length of each individual tab 120 (as measured along the side of the divider from which the tab extends), there is a finite number of dividers that can be stacked such that all of their tabs are visible. Clearly, the longer each tab, the fewer dividers can be accommodated in such a stack. Longer tabs, however, are preferable because they can carry more indicia for labeling the individual section in the binder, are easier to be grasped by a user looking to turn to that section in the binder, and are more resistant to accidental tearing and other damage. Thus, a need currently exists for a system of tabbed sheet dividers offering a larger number of tabs visible in a stack that is preferably not constrained by the length of the divider itself. The embodiments of the present disclosure answer these and other needs.

SUMMARY

In a first embodiment disclosed herein, a set of sheet dividers comprises a first plurality of sheet dividers, each divider comprising a sheet with a tab extending therefrom at a different location and for a first length along the same side as all other dividers in the first plurality; and a second plurality of sheet dividers, each divider comprising a sheet with a tab extending therefrom at a different location and for a second length along the same side as all other dividers in the second plurality, the second length being shorter than the first length, the second plurality being divided into subsets of dividers having their tabs adjacent one another and overlaid by the tab of a corresponding one of the first plurality of sheet dividers when the subset and corresponding one of the first plurality of sheet dividers are stacked together.

In another embodiment disclosed herein, a method of assembling a set of sheet dividers comprises the steps of providing a first plurality of sheet dividers, each divider comprising a sheet with a tab extending therefrom at a different location and for a first length along the same side as all other dividers in the first plurality; and providing a second plurality of sheet dividers, each divider comprising a sheet with a tab extending therefrom at a different location and for a second length along the same side as all other dividers in the second plurality, the second length being shorter than the first length, the second plurality being divided into subsets of dividers having their tabs adjacent one another and overlaid by the tab of a corresponding one of the first plurality of sheet dividers when the subset and corresponding one of the first plurality of sheet dividers are stacked together.

In a further embodiment disclosed herein, a method of dividing a plurality of sheets comprises the steps of acquiring a first plurality of sheet dividers, each divider comprising a sheet with a tab extending therefrom at a different location and for a first length along the same side as all other dividers in the first plurality; acquiring a second plurality of sheet dividers, each divider comprising a sheet with a tab extending therefrom at a different location and for a second length along the same side as all other dividers in the second plurality, the second length being shorter than the first length, the second plurality being divided into subsets of dividers having their tabs adjacent one another and overlaid by the tab of a corresponding one of the first plurality of sheet dividers when the subset and corresponding one of the first plurality of sheet dividers are stacked together; and inserting the dividers into a stack of sheets to divide the sheets into sections so that when the divided sheets are arranged in a stack, the tabs of every divider in a single subset of the second plurality are disposed beneath the tab of the corresponding one of the first plurality of dividers.

In further alternative embodiments, the tabs of the second plurality of sheet dividers may extend from the opposite side of their respective sheets to the same extent to which the tabs of the first plurality of sheet dividers extend from the opposite side of their respective sheets, or the tabs of the second plurality of sheet dividers may extend from the opposite side of their respective sheets to an extent greater than that to which the tabs of the first plurality of sheet dividers extend from the opposite side of their respective sheets.

In a still further embodiment, the set of sheet dividers may further comprise a table-of-contents sheet bearing a plurality of delineated spaces, each space disposed on the sheet to correspond to a particular tab of the first or second pluralities of sheet dividers when the table-of-contents sheet is stacked with the first and second pluralities of sheet dividers. The spaces corresponding to the tabs of the first plurality of sheet dividers and the spaces corresponding to the tabs of the second plurality of sheet dividers may be arranged in two adjacent columns on the table-of-contents sheet. Each pair of space and corresponding tab may further bear coordinated indicia. Each space may be disposed on the sheet to be aligned with its respective tab when the table-of-contents sheet is stacked with the first and second pluralities of sheet dividers.

These and other features and advantages will become further apparent from the detailed description and accompanying figures that follow. In the figures and description, numerals indicate the various features, like numerals referring to like features throughout both the drawings and the description.

DETAILED DESCRIPTION

Figure 1:
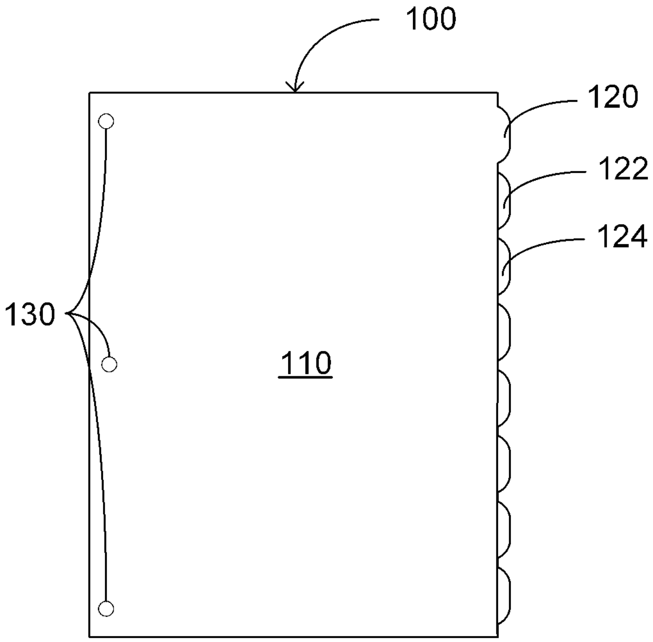
FIG. 1 is an illustration of a stacked set of sheet dividers as known in the art.
Figure 2A:
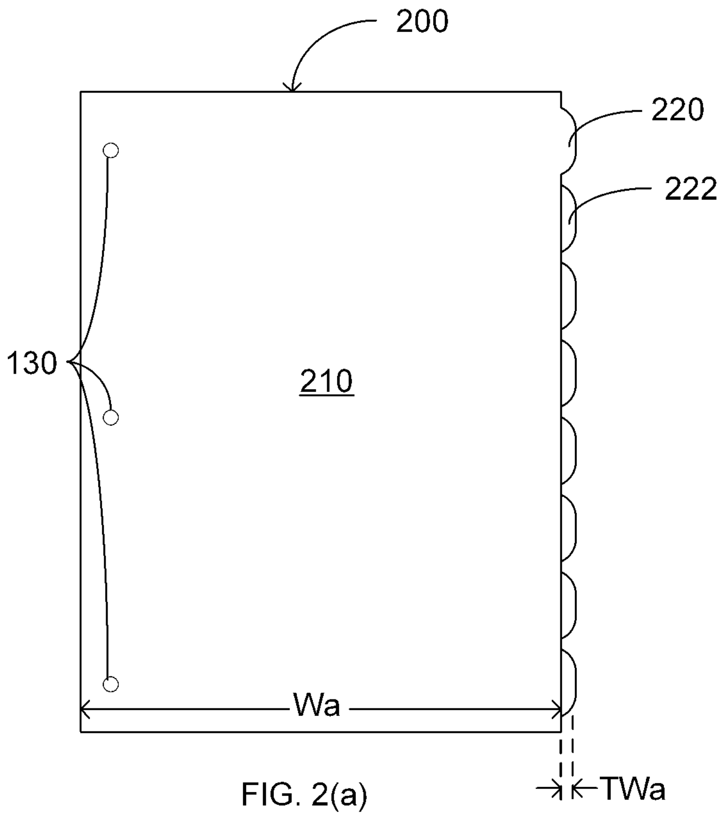
FIG. 2*a*, FIG. 2*b* and FIG. 2*c* illustrate one exemplary embodiment of sheet dividers as disclosed herein.
Figure 2B:
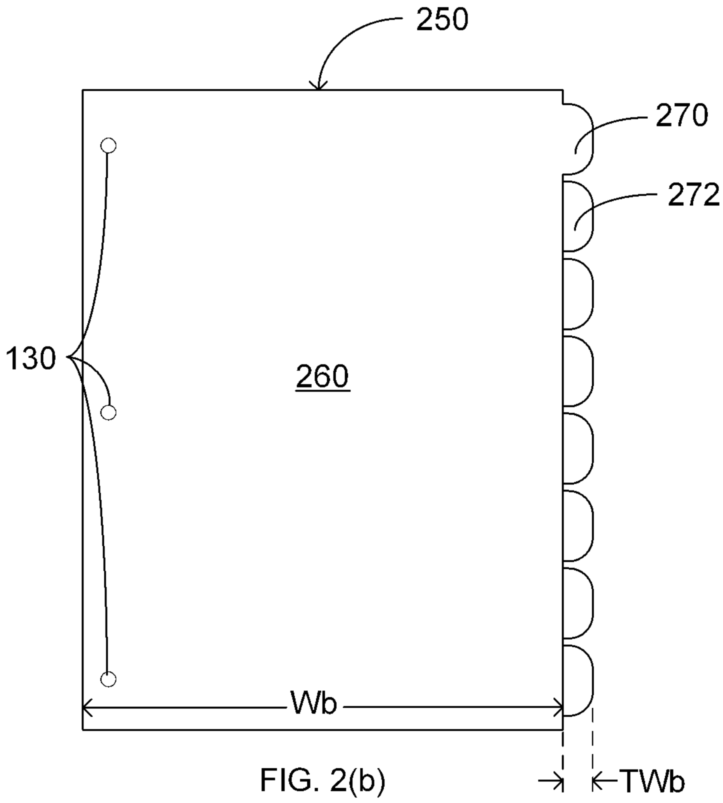
Figure 2C:
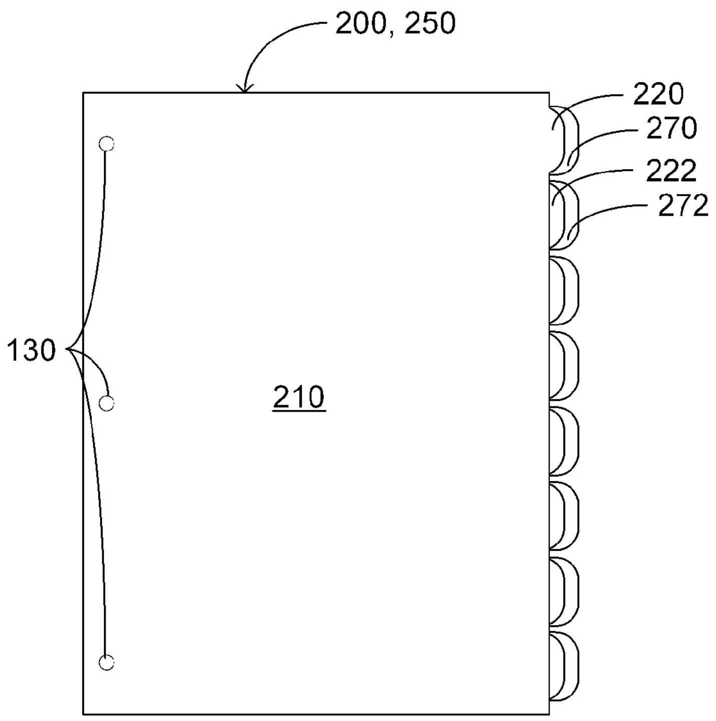

Referring to FIG. 2, in a first embodiment according to the present disclosure, the needs discussed above are addressed by providing a set of dividers that includes multiple cooperating pluralities or subsets of dividers. For ease of discussion, only two such subsets of dividers are shown in FIGS. 2(*a*) and 2(*b*) respectively, but it must be understood that the present invention contemplates any number of such subsets of dividers cooperating as described hereinafter. A main principle of this embodiment is that the overall width of the dividers in any one subsets of dividers, as measured from the outside edge of a tab to the opposite side of the divider, is different from the overall width of the dividers in any other cooperating subset, so that when cooperating subsets of dividers are stacked according to their overall width with the narrowest width on top and the widest width on the bottom, all tabs are visible from the top of the stack. This is best shown in FIG. 2(*c*), which illustrates the subset of dividers 200 of FIG. 2(*a*) stacked on top of the subset of dividers 250 of FIG. 2(*b*).

There are different approaches to achieving the effect described above, all of which are envisioned as within the scope of the present disclosure. In the embodiment of FIG. 2, the sheets 210 of the subset of dividers 200 have a width Wa as measured from the inside edge of the tab to the opposite side that is equal to the width Wb as measured from the inside edge of the tab to the opposite side of the sheets 260 of the subset of dividers 250. However, the width TWa of the tabs 220, 222, etc. of the subset of dividers 200 is narrower than the width of the width TWb of the tabs 270, 272, etc. of the subset of dividers 250. As such, and as shown in FIG. 2(*c*), when the two subsets of dividers 200, 250 are stacked with the subset of dividers having narrower tabs (i.e. dividers 200) on top of the subset of dividers having wider tabs (i.e. dividers 250), the narrower tabs 220, etc. will only partially obscure the wider tabs 270, etc. to a viewer looking at the top of the stack.

Figure 3A:
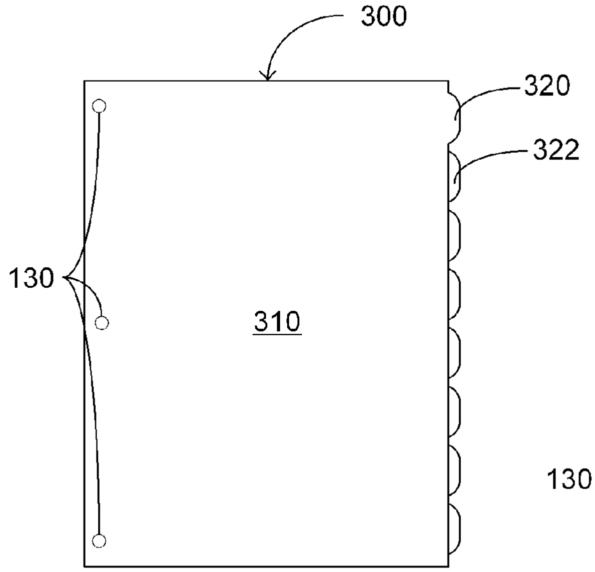
FIG. 3*a*, FIG. 3*b* and FIG. 3*c* illustrate another exemplary embodiment sheet dividers as disclosed herein.
Figure 3B:
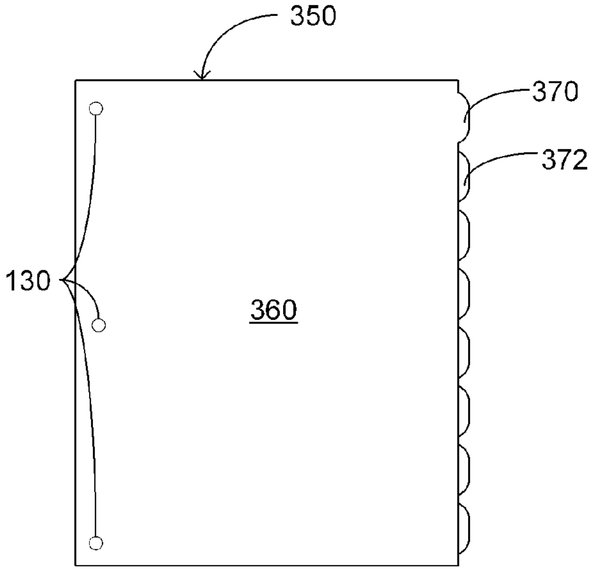
Figure 3C:
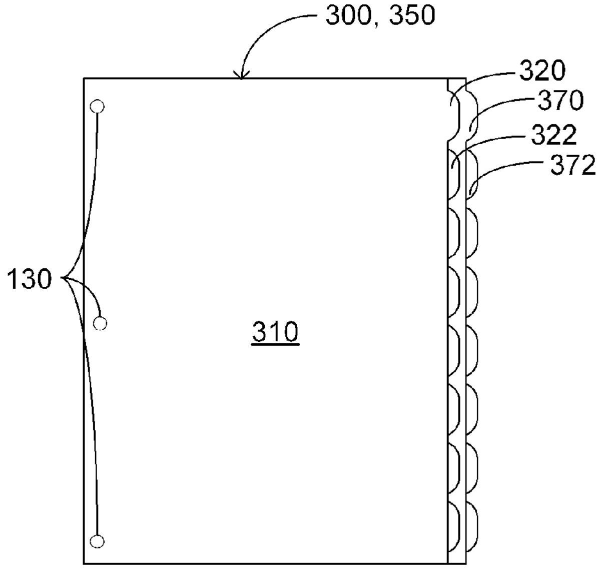

An alternative to the above embodiment is depicted in FIG. 3 and utilizes a different approach to achieve the same end result, namely providing cooperating subsets of dividers that have tabs of equal width but sheets of different widths. Thus, as shown in FIG. 3(*a*), the sheets 310 of the subset of dividers 300 have a width Wa as measured from the inside edge of the tab to the opposite side that is narrower than the width Wb as measured from the inside edge of the tab to the opposite side of the sheets 360 of the subset of dividers 350, while the width TWa of the tabs 320, 322, etc. of the subset of dividers 300 is equal to the width of the width TWb of the tabs 370, 372, etc. of the subset of dividers 350. As such, and as shown in FIG. 3(*c*), when the two subsets of dividers 300, 350 are stacked with the subset of dividers having narrower sheets (i.e. dividers 300) on top of the subset of dividers having wider sheets (i.e. dividers 350), the narrower tabs 320, etc. will again only partially obscure the wider tabs 370, etc. to a viewer looking at the top of the stack.

Figure 5B:
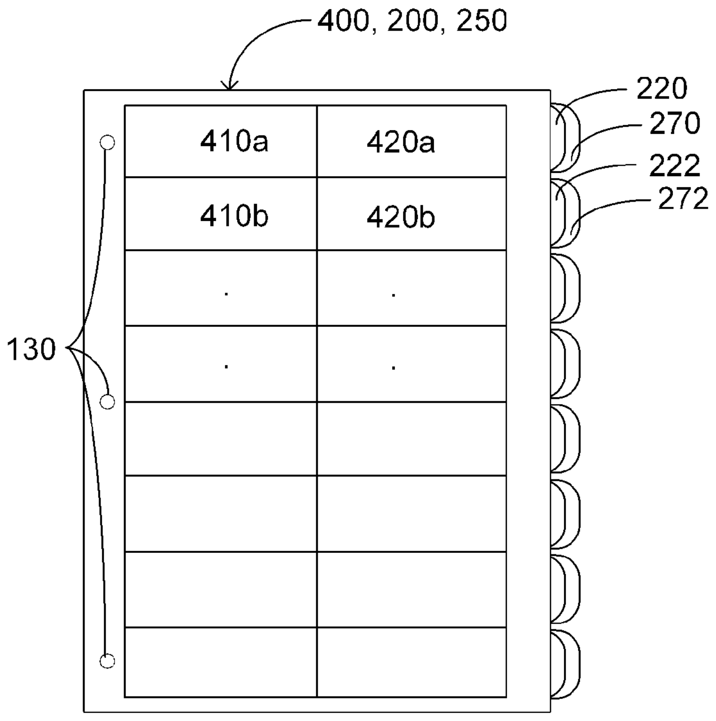
FIG. 5*a* and FIG. 5*b* depict the table of contents sheet of FIG. 4 in use with the embodiments of FIGS. 2 and 3.
Figure 4:
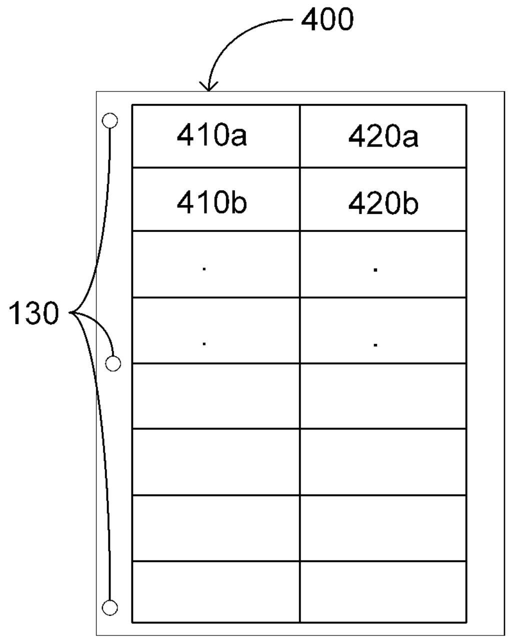
FIG. 4 is an illustration of an exemplary embodiment of a table of contents sheet for use with sheet dividers as described herein.
Figure 5A:
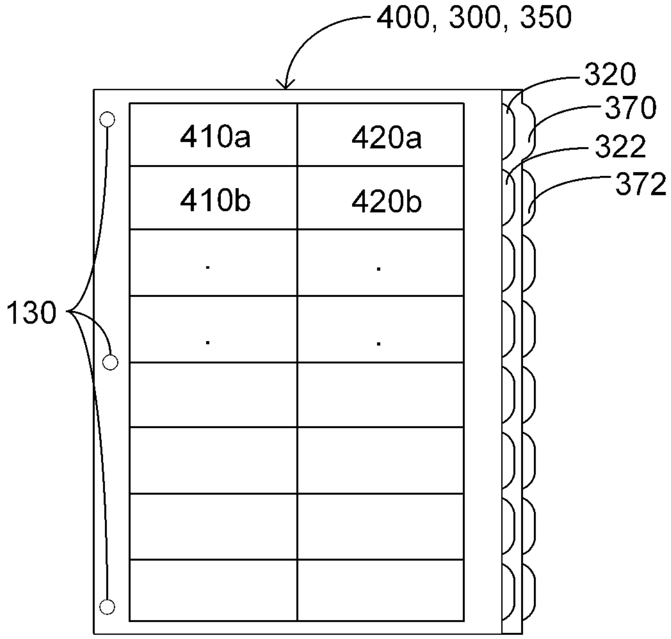

In a further embodiment, and with reference now to FIG. 4, a set of sheet dividers as disclosed herein may be further provided with a so-called table-of-contents (TOC) sheet 400 that can be inserted in the binder at the very front of the stack of divided sheets to further help identify the various sections of sheets as segregated by the dividers. The TOC sheet 400 has delineated spaces 410, 420 thereon that can preferably be marked with various indicia by a user, and that are disposed so that each such delineated space corresponds to a particular tab of the pluralities of dividers 200, 250 or 300, 350. As shown in FIG. 4, one possible embodiment of such a TOC sheet that may be used with the embodiments of FIG. 2 or FIG. 3 is provided with delineated spaces 410, 420 arranged in two adjacent columns and are each of substantially equal height as the corresponding tabs so that when the TOC sheet is stacked together with the sheet dividers, each space thereon is aligned with its corresponding tab. Thus, in the example of FIG. 4 together with the embodiment of FIG. 3 which are shown stacked together in FIG. 5(*a*), space 410*a* corresponds to and is aligned with tab 320, space 420*a* corresponds to and is aligned with tab 370, space 410*b* corresponds to and is aligned with tab 322, space 420*b* corresponds to and is aligned with tab 372, and so on. Similarly, in the example of FIG. 4 together with the embodiment of FIG. 2 which are shown stacked together in FIG. 5(*b*), space 410*a* corresponds to and is aligned with tab 220, space 420*a* corresponds to and is aligned with tab 270, space 410*b* corresponds to and is aligned with tab 222, space 420*b* corresponds to and is aligned with tab 272, and so on.

Figure 6A:
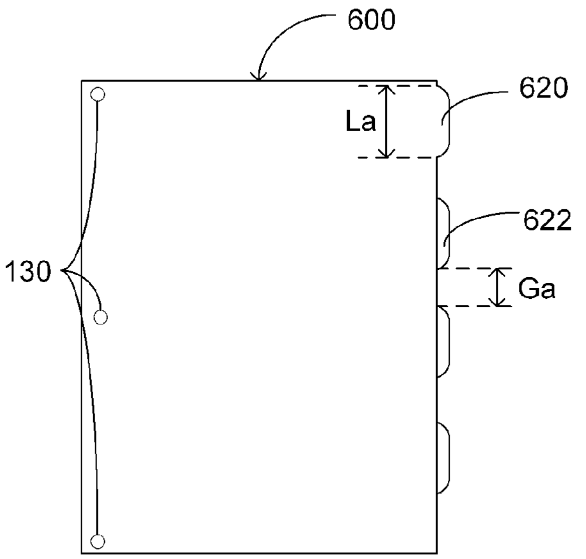
FIG. 6*a*, FIG. 6*b* and FIG. 6*c* illustrate another exemplary embodiment of sheet dividers as disclosed herein.
Figure 6B:
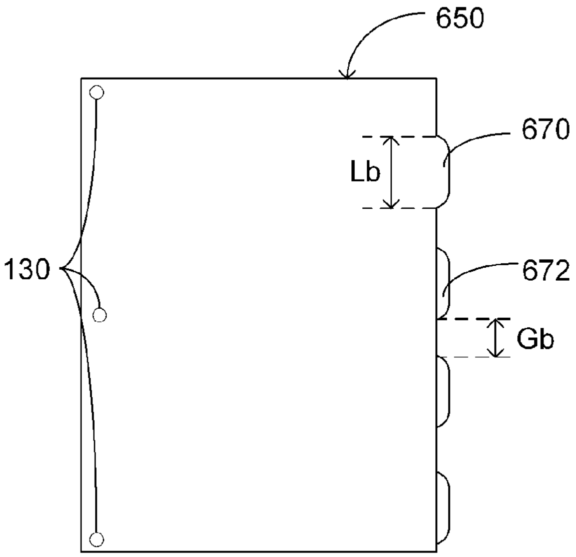
Figure 6C:
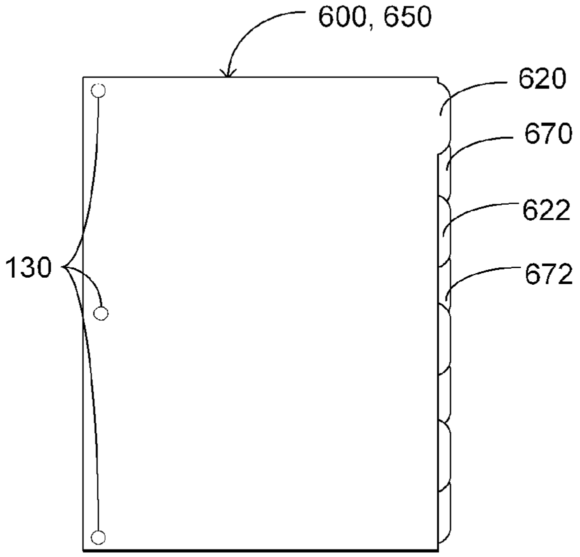
Figure 7A:
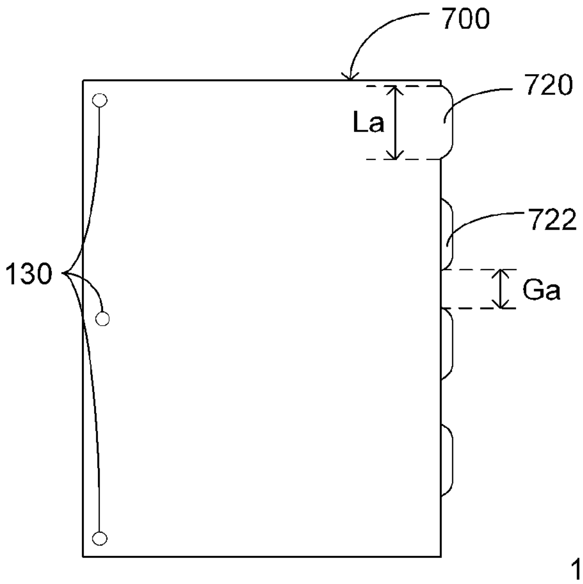
FIG. 7*a*, FIG. 7*b* and FIG. 7*c* illustrate another exemplary embodiment sheet dividers as disclosed herein.
Figure 7B:
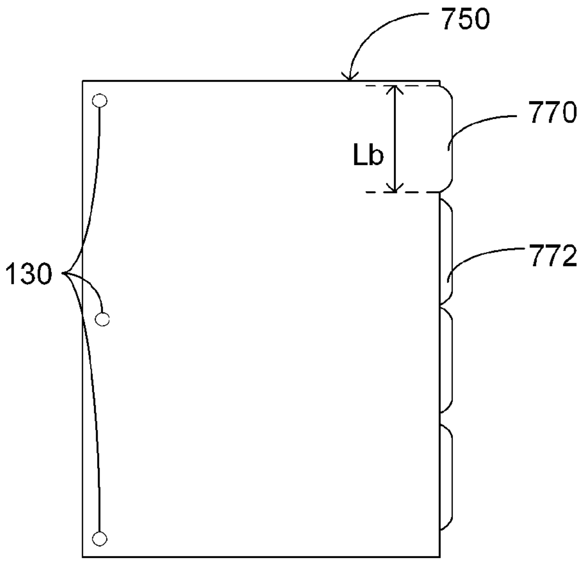
Figure 7C:
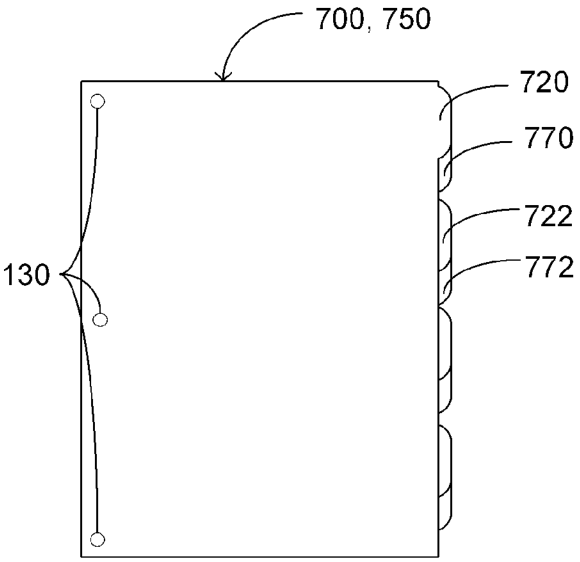

A different approach to meeting the needs identified above that is contemplated by the present writing is illustrated in FIGS. 6 and 7, wherein a main principle is the provision of two subsets of sheet dividers wherein the top subset is formed with tabs that define gaps therebetween when the dividers are arranged in a stack and the bottom subset is formed with tabs that are arranged to be visible through the gaps in the top subset when both subsets are arranged in a stack.

With reference to FIG. 6, one possible implementation of this alternative principle involves a first subset of sheet dividers 600 and a second subset of sheet dividers 650. Each divider 600 in the first subset is formed with a tab 620, 622, etc. extending from the same side thereof as all the other dividers and for a length La as measured along that same side of the divider. As shown in FIG. 6(*a*), the length La of each tab 620, 622, etc. is less than the distance between adjacent tabs when the first subset of dividers is stacked together (as measured between corresponding points on adjacent tabs) so that when the first dividers 600 are stacked together a gap Ga is defined between each pair of adjacent tabs in the first subset. Similarly, each divider 650 in the second subset is formed with a tab 670, 672, etc. extending from the same side thereof as all the other dividers and for a length Lb as measured along that same side of the divider. As shown in FIG. 6(*b*), this length Lb is greater than the length of each gap Ga. As also shown in FIG. 6(*b*), each divider 650 in the second subset is formed with a tab 670, 672, etc. disposed at a location that corresponds to a particular one of the gaps Ga between each pair of adjacent tabs in the first subset of dividers 600. In this manner, and as shown in FIG. 6(*c*), when the first and second subsets of dividers 600, 650 are arranged in a stack with the first subset of dividers 600 on top of the second subset of dividers 650, the tabs 670, 672, etc. of the second subset of dividers are partially visible through the gaps Ga between the tabs 620, 622, etc. of the first subset of sheet dividers.

In the embodiment of FIG. 6 the length Lb of the tabs 670, 672, etc. of the second subset of dividers is substantially equal to the length La of the tabs 620, 622, etc. of the first subset of dividers 600, and as such the second subset of dividers 650 also define a gap Gb between adjacent tabs when the dividers are arranged in a stack. Thus, in the embodiment of FIG. 6, the second subset of dividers 650 can also be arranged in a stack on top of the first subset of dividers 600 and the tabs 620, 622, etc. of the first subset of dividers will be partially visible through the gaps Gb between the tabs 670, 672, etc. of the second subset of sheet dividers. Among the advantages conferred by this approach is the ability to provide longer tabs, which can thus bear further indicia, and the gaps between the top tabs allow a partial but sufficient view of the bottom tabs for a user to be able to identify the desired tab without having to lift all of the first tabs and the sheets they subdivide.

However, the length of the tabs in the first and second subsets does not have to be equal, provided that the tabs of the dividers disposed on top provide gaps through which the tabs of the dividers disposed on the bottom can be partially viewed. Thus, in one such embodiment as shown in FIG. 7(*a*), a first subset of dividers 700 may be substantially similar to the first subset of dividers 600 discussed above and shown in FIG. 6(*a*), with a similar gap Ga between adjacent tabs 720, 722, etc. when the dividers 700 are arranged in a stack. However, in this embodiment, a second subset of dividers 750 as shown in FIG. 7(*b*) is formed with tabs 770, 772, etc., each having a length Lb that is longer than the length La of the tabs 720, 722, etc. of the first subset of dividers. Thus, as shown in FIG. 7(*c*), when the first and second subsets of dividers 700, 750 are arranged in a stack with the first subset of dividers 700 on top of the second subset of dividers 750, the tabs 770, 772, etc. of the second subset of dividers are partially visible through the gaps Ga between the tabs 720, 722, etc. of the first subset of sheet dividers. As the skilled reader will appreciate, among the advantages conferred by this alternative approach is the ability to provide one set of even longer tabs, which can thus bear even further indicia, and still be identifiable by a viewer from the top through the partial but sufficient view afforded by the gaps between the top tabs.

Figure 8A:
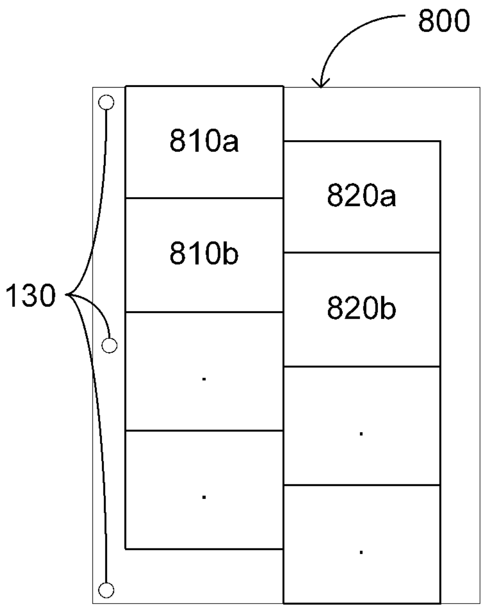
FIG. 8*a* and FIG. 8*b* illustrate an exemplary embodiment of a table of contents sheet for use with, and in use with, the embodiment of FIG. 6 as disclosed herein.
Figure 8B:
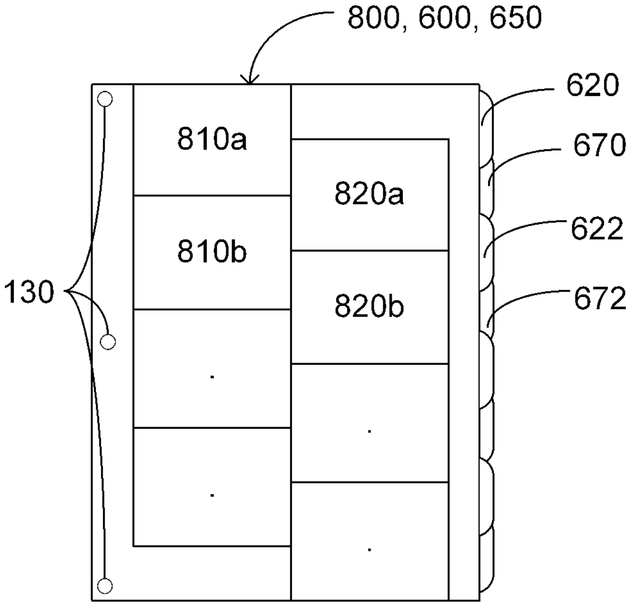
Figure 9A:
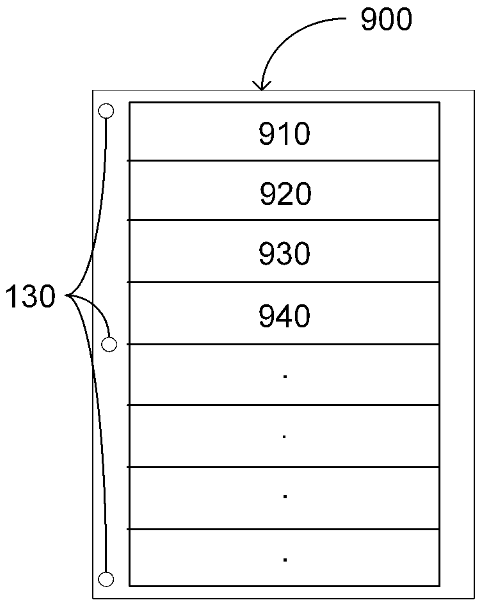
FIG. 9*a* and FIG. 9*b* illustrate an exemplary embodiment of a table of contents sheet for use with, and in use with, the embodiment of FIG. 7 as disclosed herein.
Figure 9B:
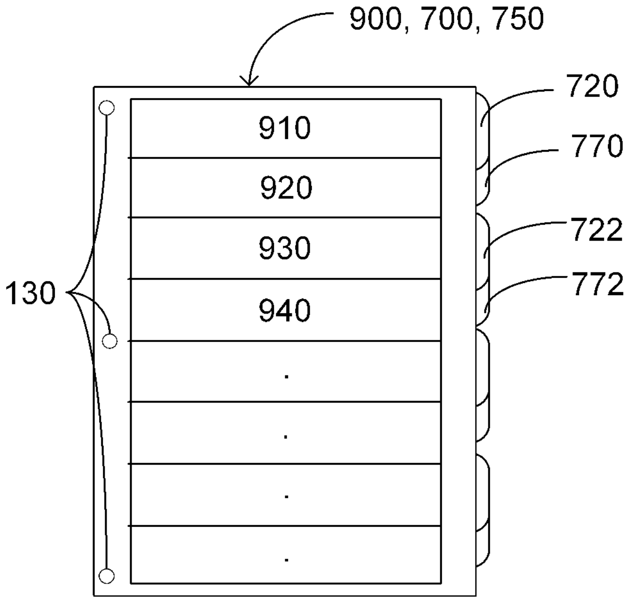

Similar to previous embodiments, the embodiments of FIGS. 6 and 7 may also be provided with a TOC sheet such as sheet 800 as shown in FIG. 8(*a*), or sheet 900 as shown in FIG. 9(*a*). Sheet 800 is provided with delineated spaces 810, 820 thereon that can preferably be marked with various indicia by a user, and that are disposed so that each such delineated space corresponds to a particular tab of the pluralities of dividers 600, 650 or 700, 750. FIG. 8(*b*) depicts the embodiment of a TOC sheet 800 according to FIG. 8(*a*) arranged in a stack with the embodiment of FIG. 6, although the TOC sheet 800 may be used equally successfully with the embodiment of FIG. 7. As shown, TOC sheet 800 is provided with delineated spaces 810, 820 arranged in two adjacent columns and are each of greater height than the lengths La, Lb of the corresponding tabs 720, 770, etc., and are positioned on the TOC sheet so that when the TOC sheet is stacked together with the sheet dividers, each space thereon is aligned with its corresponding tab. Thus, in the example of FIG. 8(*b*), space 810*a* corresponds to and is aligned with tab 620, space 820*a* corresponds to and is aligned with tab 670, space 810*b* corresponds to and is aligned with tab 622, space 820*b* corresponds to and is aligned with tab 672, and so on. Alternatively, as in the embodiment of FIG. 4, delineated spaces 810, 820 may be of substantially equal height to the lengths La, Lb of the corresponding tabs 720, 770, etc.

FIG. 9(*b*) depicts the embodiment of a TOC sheet 900 according to FIG. 9(*a*) arranged in a stack with the embodiment of FIG. 7, although the TOC sheet 900 may be used equally successfully with the embodiment of FIG. 6. As shown, TOC sheet 900 is provided with delineated spaces 910, 920 arranged in a single column and are each of substantially equal height to the length La of the corresponding tabs 720, 722, etc., which are the shorter tabs of the two subsets of dividers 700, 750. The delineated spaces 910, 920, etc. are positioned on the TOC sheet 900 so that when the TOC sheet is stacked together with the sheet dividers 700, 750, each space thereon is aligned with its corresponding tab. Thus, in the example of FIG. 9(*b*), space 910 corresponds to and is aligned with tab 720, space 920 corresponds to and is aligned with tab 770, space 930 corresponds to and is aligned with tab 722, space 940 corresponds to and is aligned with tab 772, and so on.

It is further noted that the embodiments of FIGS. 6-9 are illustrated with sheet dividers that have substantially equal overall widths as measured from the outside edge of the respective tab to the opposite side of the divider. However, as discussed immediately below, the present invention is not limited to this configuration.

Thus, in yet another novel approach to meeting the needs identified above, the present invention contemplates a solution that is in essence a hybrid of the embodiments of FIGS. 2 and 3 and of FIGS. 6 and 7, wherein the subset of sheet dividers disposed on top is formed with both an overall shorter width than the sheet dividers disposed below as well as with tabs that define gaps between adjacent tabs when the sheet dividers are arranged in a stack to afford a partial view of the tabs underneath. In this manner, the visibility of the tabs of the sheet dividers disposed at the bottom is yet further enhanced.

Figure 10A:
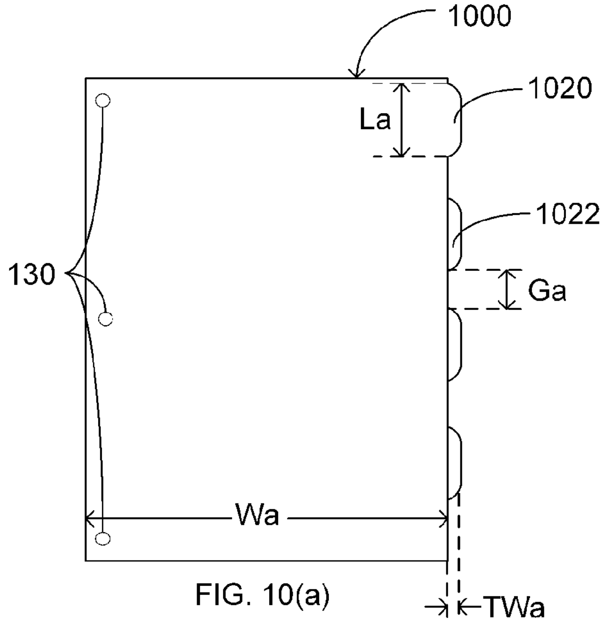
FIG. 10*a*, FIG. 10*b* and FIG. 10*c* illustrate another exemplary embodiment of sheet dividers as disclosed herein.
Figure 10B:
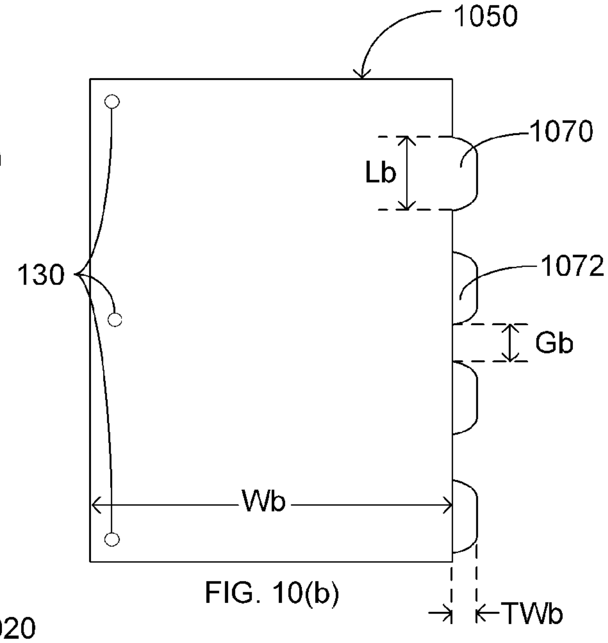
Figure 10C:
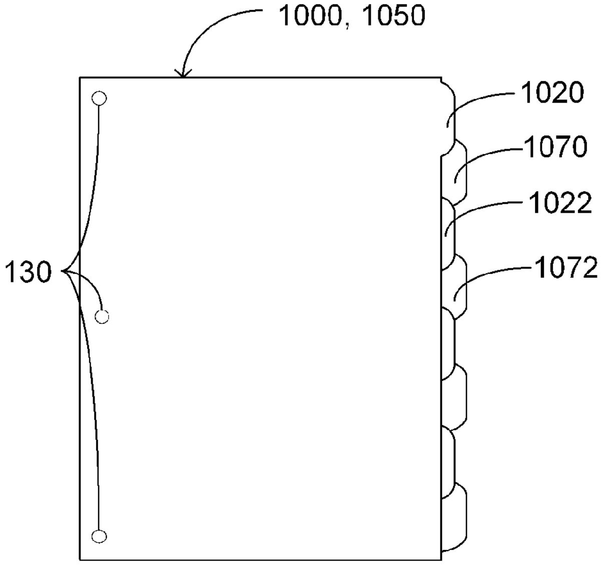

With reference to FIG. 10(*a*), a subset of sheet dividers 1000 that are intended to be disposed on top may be essentially the same as the sheet dividers 600 shown in FIG. 6(*a*) and discussed above. Dividers 1000 have a width Wa as measured from the inside edge of the tab 1020, 1022, etc. to the opposite side of the divider, and are formed with tabs

1020, 1022, etc. that are aligned so as to define gaps Ga between adjacent tabs when the dividers are arranged in a stack. The subset of dividers 1050 that are intended to be disposed underneath the sheet dividers 1000 are, as shown in FIG. 10(*b*), formed similar to sheet dividers 650 shown in FIG. 6(*b*), each having a tabs 1070, 1072, etc. disposed at a location that corresponds to a particular one of the gaps Ga between each pair of adjacent tabs in the first subset of dividers 1000. The width of the second subset of dividers 1050 Wb as measured from the inside edge of the tab 1070, 1072, etc. to the opposite side of the divider is substantially equal to the width Wa of the first subset of dividers 1000. However, the width TWa of each tab 1020, 1022, etc. in the first subset of dividers (that is, the extent to which the tabs extend from the side of the respective dividers) is narrower than the width TWb of the tabs 1070, 1072, etc. of the second subset of dividers. In this manner, and as shown in FIG. 10(*c*), when the first and second subsets of dividers 1000, 1050 are arranged in a stack with the first subset of dividers 1000 on top of the second subset of dividers 1050, the tabs 1070, 1072, etc. of the second subset of dividers are partially visible through the gaps Ga between, as well as extend past the outer edge of, the tabs 1020, 1022, etc. of the first subset of sheet dividers. As previously mentioned, this provides further enhanced visibility of the bottom set of dividers. Thus, it is hereby explicitly stated that the invention contemplates any combination of $Wa \leqq Wb$ and $TWa \leqq TWb$. FIG. 10 illustrates a non-limiting embodiment wherein Wa=Wb and $TWa \leqq TWb$, while FIG. 6 a non-limiting embodiment wherein illustrates Wa=Wb and TWa=TWb.

Figure 11A:
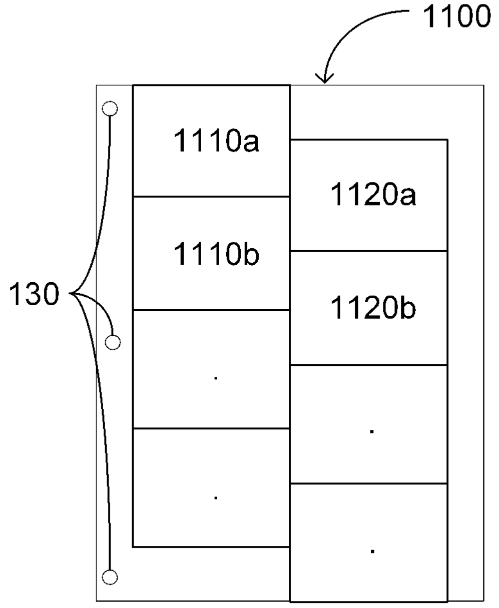
FIG. 11*a* and FIG. 11*b* illustrate an exemplary embodiment of a table of contents sheet for use with, and in use with, the embodiment of FIG. 10 and as disclosed herein.
Figure 11B:
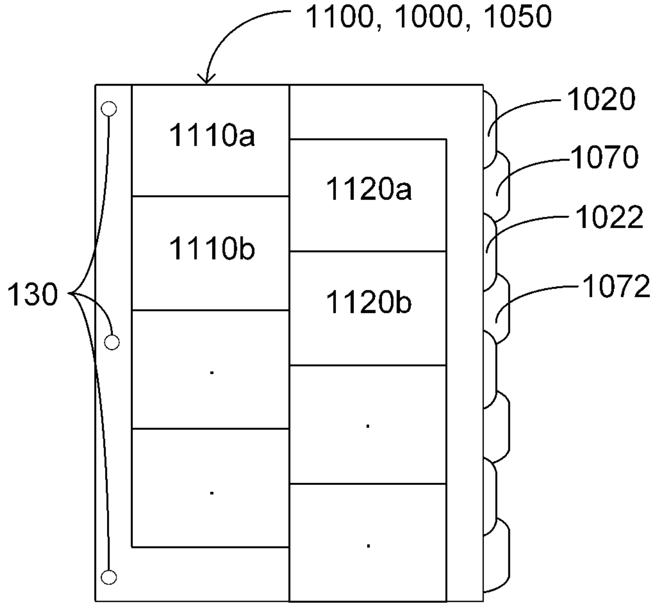
Figure 12A:
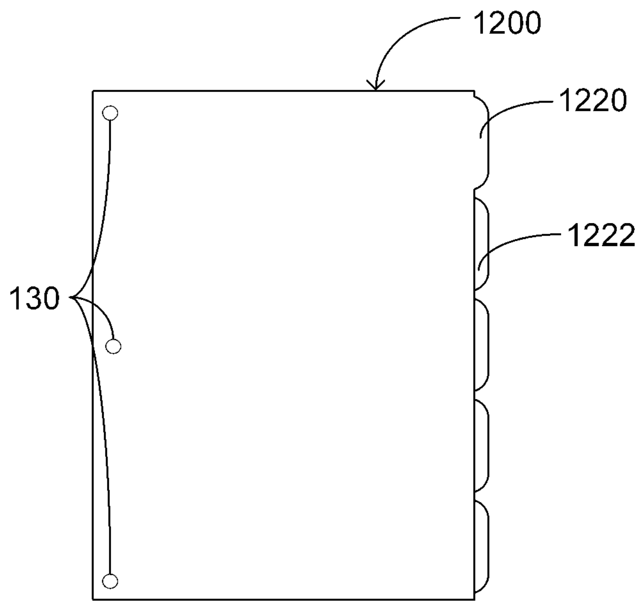
FIG. 12*a*, FIG. 12*b*, FIG. 12*c* and FIG. 12*d* illustrate another exemplary embodiment of sheet dividers as disclosed herein.
Figure 12B:
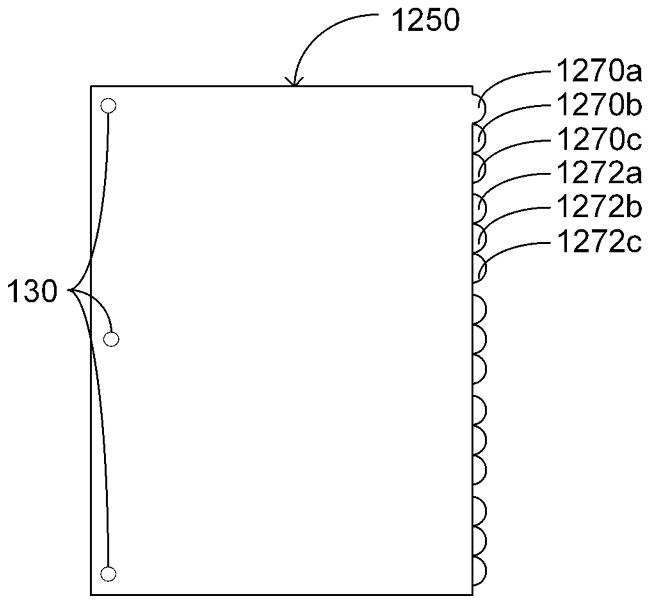
Figure 12C:
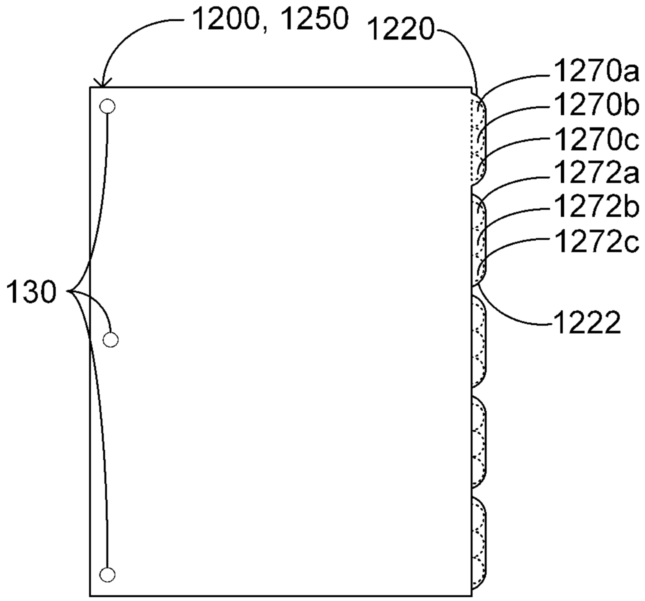
Figure 12D:
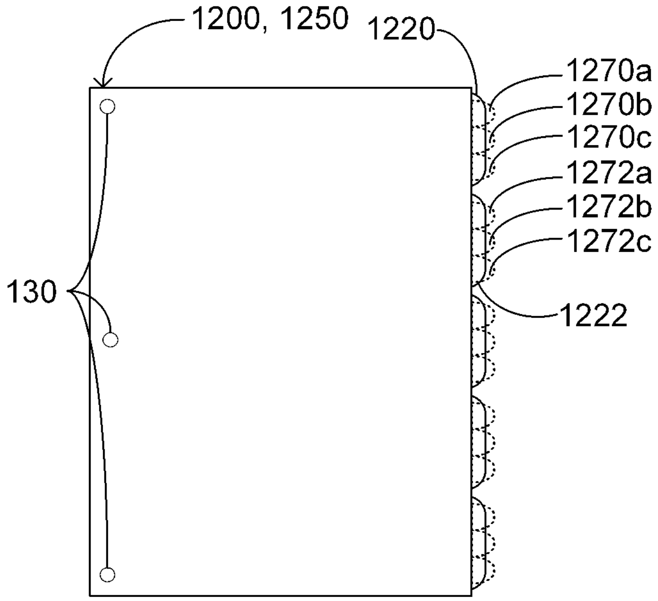

As with previous embodiments, a TOC sheet 1100 with delineated spaces 1110, 1120 disposed in two adjacent columns as shown in FIG. 11(*a*) may be provided to be stacked together with the dividers 1000, 1050 in the manner shown in FIG. 11(*b*) and described elsewhere herein with regards to the foregoing embodiments. It is to be understood that any of the TOC sheets shown and described elsewhere herein and their equivalents without limitation may also be used with the dividers 1000, 1050 according to the invention.

With reference now to FIG. 12, in a final embodiment disclosed herein, two subsets of dividers cooperate in a different manner than those described above. Specifically, as shown in FIG. 12(*a*), a first subset of sheet dividers 1200 is provided that are essentially typical sheet dividers with tabs 1220, 1222, etc. extending from one side thereof as known in the art or described elsewhere herein. However, as shown in FIG. 12(*b*), a second subset of sheet dividers 1250 is provided with tabs 1270*a*, 1270*b*, 1270*c*, 1272*a*, 1272*b*, 1272*c*, etc., extending from one side thereof and formed such that each sheet divider 1220, 1222, etc. from among the first subset of sheet dividers 1200 cooperates with a further subset of the second subset of sheet dividers 1250 so that the tab of the divider from the first subset of sheet dividers overlies and covers the tabs of the respective further subset of the second subset of sheet dividers when stacked together. In the particular exemplary embodiment of FIG. 12, first sheet divider tab 1220 covers the further subset of the second subset of sheet dividers having tabs 1270*a*, 1270*b*, and 1270*c*, while first sheet divider tab 1222 covers the further subset of the second subset of sheet dividers having tabs 1272*a*, 1272*b*, and 1272*c*, etc. Although in the exemplary embodiment of FIG. 12 each further subset of the second subset of sheet dividers is shown as consisting of three such sheet dividers 1250, the invention contemplates any number of such dividers greater than one.

In use, a user may divide sheets in a stack into Sections with the sheet dividers 1200 of the first subset of dividers, and then further divide each such Section into further Subsections with the sheet dividers 1250 in the second subset of dividers. Using the embodiment of FIG. 12, a user may divide each Section of sheets in a binder into up to three further Subsections. In this manner, a first sheet divider 1200 corresponding to a first Section is overlain on top of up to three of the cooperating second sheet dividers 1250 which are themselves interlaid among the sheets to divide them into respective first Subsections such that first sheet divider tab 1220 overlies all three second sheet divider tabs 1270*a*, 1270*b*, 1270*c*, a second sheet divider 1200 corresponding to a second Section is overlain on top of up to three of the cooperating second sheet dividers 1250 which are themselves interlaid among the sheets to divide them into respective second Subsections such that first sheet divider tab 1222 overlies all three second sheet divider tabs 1272*a*, 1272*b*, 1272*c*, and so on, as shown in FIG. 12(*c*). In a further exemplary embodiment, and as shown in FIG. 12(*d*), the tabs 1270*a*, 1270*b*, 1270*c*, 1272*a*, 1272*b*, 1272*c*, etc., of the second sheet dividers 1250 may extend laterally past the outside edges of the tabs 1220, 1222, etc. of the first plurality of sheet dividers 1200 so that a portion of these tabs is visible even when overlaid by the respective cooperating first plurality of dividers.

Figure 13A:
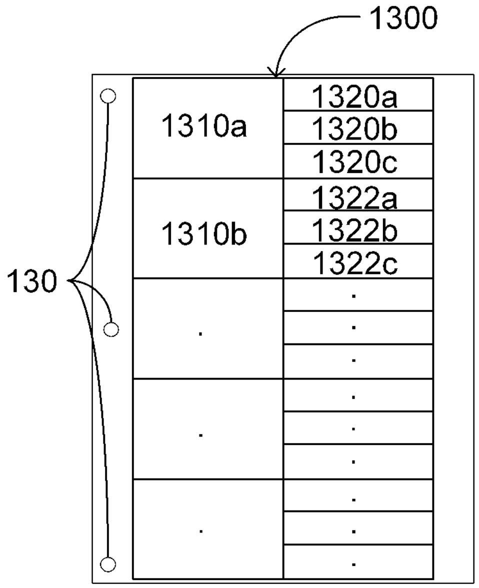
FIG. 13*a* and FIG. 13*b* illustrate an exemplary embodiment of a table of contents sheet for use with, and in use with, the embodiment of FIG. 12 and as disclosed herein.
Figure 13B:
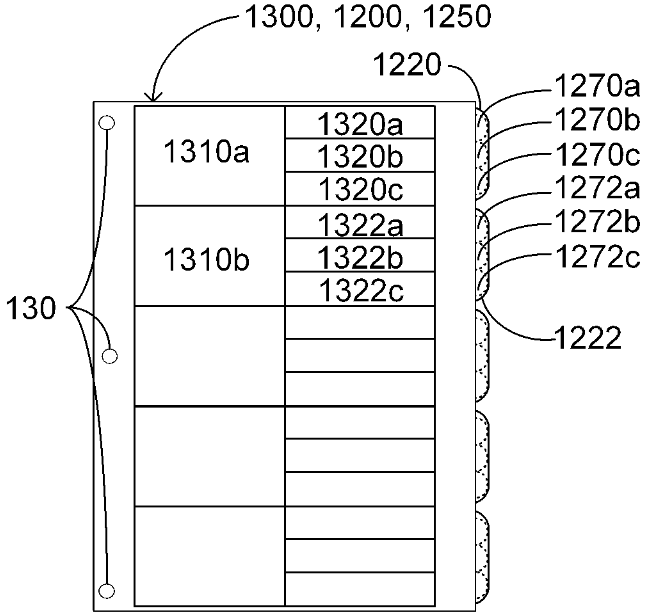

This embodiment can also advantageously be provided with a TOC sheet 1300 as shown in FIG. 13(*a*), wherein delineated spaces 1310, 1320 are disposed in two adjacent columns a and b as shown in FIG. 11(*a*) so that each delineated space 1310*a*, 1310*b*, etc. corresponds to one of the tabs 1220, 1222, etc. for defining user Sections in the divided sheets, each delineated space 1320*a*, 1320*b*, 1320*c* corresponds to one of the tabs 1270*a*, 1270*b*, 1270*c* for defining first user Subsections, each delineated space 1322*a*, 1322*b*, 1322*c* corresponds to one of the tabs 1272*a*, 1272*b*, 1272*c* for defining second user Subsections, and so on in the manner shown in FIG. 13(*b*). This embodiment may be further modified by varying the relative values of Wa, Wb, TWa and TWb as described above.

It must be understood that although all embodiments depicted in the drawings are shown with tabs having generally the same geometric shape, the present writing contemplates pluralities of dividers that are formed with tabs of various geometric shapes, such as square, triangular, rounded, curved, oval, rhomboid, etc. It is also contemplated that the tab shapes may vary within a set of dividers or between sets of dividers. Furthermore, it is hereby explicitly affirmed that the present invention contemplates any number of subsets of dividers cooperating in the various manners as described above and is in no way intended to be limited to only two such subsets of dividers. It must also be understood that the construction of the tabs is immaterial to the practice of the present invention, and any and all manners of tabs are envisioned within the scope of the invention, including tabs formed of a single sheet of material, and tabs formed with an enclosed space for receiving a piece of paper or other indicia-bearing material therein.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein. The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementa-tion. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicants have made this disclosure with respect to the current state of the art, but also contemplate advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A set of sheet dividers, comprising:

a first plurality of sheet dividers, each divider of the first plurality of sheet dividers comprising a sheet with a tab extending therefrom at a different location and for a first length along the same side as all other dividers in the first plurality of sheet dividers; and a second plurality of sheet dividers, each divider of the second plurality of sheet dividers comprising a sheet with a tab extending therefrom at a different location and for a second length along the same side as all other dividers in the second plurality of sheet dividers, the second length being shorter than the first length, the second plurality of sheet dividers being divided into subsets of dividers having their tabs adjacent one another and all tabs of a single subset of the second plurality of sheet dividers being overlaid by the tab of a corresponding one of the first plurality of sheet dividers when the single subset of the second plurality of sheet dividers and corresponding one of the first plurality of sheet dividers are stacked together wherein the same side of all of the dividers in the second plurality of sheet dividers are aligned.

2. The set of sheet dividers claimed in claim 1, wherein the tabs of the second plurality of sheet dividers extend from the opposite side of their respective sheets to the same extent to which the tabs of the first plurality of sheet dividers extend from the opposite side of their respective sheets.

3. The set of sheet dividers claimed in claim 1, wherein the tabs of the second plurality of sheet dividers extend from the opposite side of their respective sheets to an extent greater than that to which the tabs of the first plurality of sheet dividers extend from the opposite side of their respective sheets.

4. The set of sheet dividers claimed in claim 1, further comprising:

a table-of-contents sheet bearing a plurality of delineated spaces, each space disposed on the sheet to correspond to a particular tab of the first or second pluralities of sheet dividers when the table-of-contents sheet is arranged in a stack with the first and second pluralities of sheet dividers.

5. The set of sheet dividers claimed in claim 4, wherein the spaces corresponding to the tabs of the first plurality of sheet dividers and the spaces corresponding to the tabs of the second plurality of sheet dividers are arranged in two adjacent columns on the table-of-contents sheet.

6. The set of sheet dividers claimed in claim 4, wherein each pair of space and corresponding tab bear coordinated indicia.

7. The set of sheet dividers claimed in claim 4, wherein each space is disposed on the sheet to be aligned with its respective tab when the table-of-contents sheet is arranged in a stack with the first and second pluralities of sheet dividers.

8. A method of assembling a set of sheet dividers, comprising the steps of:

providing a first plurality of sheet dividers, each divider of the first plurality of sheet dividers comprising a sheet with a tab extending therefrom at a different location and for a first length along the same side as all other dividers in the first plurality of sheet dividers; and providing a second plurality of sheet dividers, each divider of the second plurality of sheet dividers comprising a sheet with a tab extending therefrom at a different location and for a second length along the same side as all other dividers in the second plurality of sheet dividers, the second length being shorter than the first length, the second plurality of sheet dividers being divided into subsets of dividers having their tabs adjacent one another and all tabs of a single subset of the second plurality of sheet dividers being overlaid by the tab of a corresponding one of the first plurality of sheet dividers when the single subset of the second plurality of sheet dividers and corresponding one of the first plurality of sheet dividers are stacked together wherein the same side of all of the dividers in the second plurality of sheet dividers are aligned.

9. The method claimed in claim 8, wherein the tabs of the second plurality of sheet dividers extend from the opposite side of their respective sheets to the same extent to which the tabs of the first plurality of sheet dividers extend from the opposite side of their respective sheets.

10. The method claimed in claim 8, wherein the tabs of the second plurality of sheet dividers extend from the opposite side of their respective sheets to an extent greater than that to which the tabs of the first plurality of sheet dividers extend from the opposite side of their respective sheets.

11. The method claimed in claim 8, further comprising the step of:

providing a table-of-contents sheet bearing a plurality of delineated spaces, each space disposed on the sheet to correspond to a particular tab of the first or second pluralities of sheet dividers when the table-of-contents sheet is arranged in a stack with the first and second pluralities of sheet dividers.

12. The method claimed in claim 11, wherein the spaces corresponding to the tabs of the first plurality of sheet dividers and the spaces corresponding to the tabs of the second plurality of sheet dividers are arranged in two adjacent columns on the table-of-contents sheet.

13. The method claimed in claim 11, wherein each pair of space and corresponding tab bear coordinated indicia.

14. The method claimed in claim 11, wherein each space is disposed on the sheet to be aligned with its respective tab when the table-of-contents sheet is arranged in a stack with the first and second pluralities of sheet dividers.

15. A method of dividing a plurality of sheets, comprising the steps of:

acquiring a first plurality of sheet dividers, each divider of the first plurality of sheet dividers comprising a sheet with a tab extending therefrom at a different location and for a first length along the same side as all other dividers in the first plurality of sheet dividers;

acquiring a second plurality of sheet dividers, each divider of the second plurality of sheet dividers comprising a sheet with a tab extending therefrom at a different location and for a second length along the same side as all other dividers in the second plurality of sheet dividers, the second length being shorter than the first length, the second plurality of sheet dividers being divided into subsets of dividers having their tabs adjacent one another and all tabs of a single subset of the second plurality of sheet dividers being overlaid by the tab of a corresponding one of the first plurality of sheet dividers when the single subset of the second plurality of sheet dividers and corresponding one of the first plurality of sheet dividers are stacked together; and inserting the dividers into a stack of sheets to divide the sheets into sections so that when the divided sheets are arranged in a stack, the tabs of every divider in a single subset of the second plurality of sheet dividers are disposed beneath the tab of the corresponding one of the first plurality of dividers wherein the same side of all of the dividers in the second plurality of sheet dividers are aligned.

16. The method claimed in claim 15, wherein the tabs of the second plurality of sheet dividers extend from the opposite side of their respective sheets to the same extent to which the tabs of the first plurality of sheet dividers extend from the opposite side of their respective sheets.

17. The method claimed in claim 15, wherein the tabs of the second plurality of sheet dividers extend from the opposite side of their respective sheets to an extent greater than that to which the tabs of the first plurality of sheet dividers extend from the opposite side of their respective sheets.

18. The method claimed in claim 15, further comprising:

disposing a table-of-contents sheet bearing a plurality of delineated spaces at the front of the stack of divided sheets, each space disposed on the sheet to correspond to a particular tab of the first or second pluralities of sheet dividers when the table-of-contents sheet is stacked with the first and second pluralities of sheet dividers.

19. The method claimed in claim 18, wherein the spaces corresponding to the tabs of the first plurality of sheet dividers and the spaces corresponding to the tabs of the second plurality of sheet dividers are arranged in two adjacent columns on the table-of-contents sheet.

20. The method claimed in claim 18, wherein each pair of space and corresponding tab bear coordinated indicia.

21. The method claimed in claim 18, wherein each space is disposed on the sheet to be aligned with its respective tab when the table-of-contents sheet is stacked with the first and second pluralities of sheet dividers.

22. The set of sheet dividers claimed in claim 4, wherein the table-of-contents sheet is printable in a printer or copier.

23. The method claimed in claim 11, wherein the table-of-contents sheet is printable in a printer or copier.

24. The method claimed in claim 18, wherein the table-of-contents sheet is printable in a printer or copier.

25. A set of sheet dividers, comprising:

a first plurality of sheet dividers, each divider of the first plurality of sheet dividers including a sheet and a tab;

the sheet including a first edge and a second edge opposite the first edge, the sheet including a first sheet width between the first edge and the second edge, and each tab positioned at a different location on the first edge of the sheet as all other dividers of the first plurality, extending for a first length along the first edge of the sheet, and extending a first tab width from the first edge of the sheet; and a second plurality of sheet dividers, each divider of the second plurality of sheet dividers including a sheet and a tab;

the sheet including a first edge and a second edge opposite the first edge, the sheet including a second sheet width between the first edge and the second edge, and each tab positioned at a different location on the first edge of the sheet as all other dividers of the second plurality, extending for a second length along the first edge of the sheet, and extending a second tab width from the first edge of the sheet;

wherein:

the first sheet width and the second sheet width are equal, the first tab width and the second tab width are equal, the second length is shorter than the first length, and all tabs of a subset of the second plurality of sheet dividers are overlaid by a tab of the first plurality of sheet dividers wherein the same side of all of the dividers in the second plurality of sheet dividers are aligned.

* * * * *